United States Patent
Di Blas et al.

(10) Patent No.: US 10,417,128 B2
(45) Date of Patent: Sep. 17, 2019

(54) MEMORY COHERENCE IN A MULTI-CORE, MULTI-LEVEL, HETEROGENEOUS COMPUTER ARCHITECTURE IMPLEMENTING HARDWARE-MANAGED AND SOFTWARE MANAGED CACHES

(71) Applicant: Oracle International Corporation, Redwood Shores, CA (US)

(72) Inventors: Andrea Di Blas, Irvine, CA (US); Aarti Basant, Santa Clara, CA (US); Arun Raghavan, Belmont, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 171 days.

(21) Appl. No.: 14/705,806

(22) Filed: May 6, 2015

(65) Prior Publication Data
US 2016/0328326 A1 Nov. 10, 2016

(51) Int. Cl.
*G06F 12/0831* (2016.01)
*G06F 12/0837* (2016.01)

(52) U.S. Cl.
CPC ...... *G06F 12/0837* (2013.01); *G06F 12/0833* (2013.01); *G06F 2212/1008* (2013.01); *G06F 2212/1041* (2013.01); *G06F 2212/60* (2013.01)

(58) Field of Classification Search
CPC ............. G06F 12/0873; G06F 2212/62; G06F 2212/621
See application file for complete search history.

(56) References Cited

U.S. PATENT DOCUMENTS 6,490,666 B1 * 12/2002 Cabrera ............... G06F 12/123
707/999.202
7,574,566 B2 8/2009 Laudon
(Continued)

FOREIGN PATENT DOCUMENTS

WO WO2014/065880 A1 5/2014

OTHER PUBLICATIONS

Elsevier Inc., Cache Coherence, 2010, Slides 13-21.*
Wikipedia, "Cache Coherence", http://en.wikipedia.org/wiki/Cache coherence, dated Apr. 1, 2019, 1 page.
T. J. Ashby et al., "Software-based Cache Coherence with Hardware-assisted Selective Self-invalidations Using Bloom Filters", Computers, IEEE Transactions on, 60(4), pp. 472-483, dated 2011.
(Continued)

*Primary Examiner* — Ann J Lo
*Assistant Examiner* — Michelle L Taeuber
(74) *Attorney, Agent, or Firm* — Hickman Palermo Becker Bingham LLP

(57) ABSTRACT

Techniques are described for memory coherence in a multi-core system with a heterogeneous memory architecture comprising one or more hardware-managed caches and one or more software-managed caches. According to one embodiment, a set of one or more buffers are allocated in memory, and each respective buffer is associated with a respective metadata tag. The metadata tag may be used to store metadata that identifies a state associated with the respective buffer. The multi-core system may enforce coherence for the one or more hardware-managed caches and the one or more software-managed caches based on the metadata stored in the metadata tag for each respective buffer in the set of one or more buffers. The multi-core system may read the metadata to determine whether a particular buffer is in a hardware-managed or a software-managed cacheable state. Based on the current state of the particular buffer, the multi-core system may perform coherence operations.

20 Claims, 11 Drawing Sheets

(56) References Cited

U.S. PATENT DOCUMENTS

| | | | |
|---|---|---|---|
| 7,805,575 B1* | 9/2010 | Agarwal | G06F 12/0811 |
| | | | 711/141 |
| 8,135,916 B1 | 3/2012 | O'Bleness et al. | |
| 8,296,368 B2 | 10/2012 | Ebbes et al. | |
| 8,776,034 B2 | 7/2014 | Chen et al. | |
| 2003/0163642 A1* | 8/2003 | Borkenhagen | G06F 12/0837 |
| | | | 711/121 |
| 2003/0212865 A1 | 11/2003 | Hicken et al. | |
| 2008/0147986 A1* | 6/2008 | Chinthamani | G06F 12/0831 |
| | | | 711/141 |
| 2011/0161596 A1* | 6/2011 | Conte | G06F 12/0817 |
| | | | 711/130 |
| 2014/0237185 A1* | 8/2014 | Solihin | G06F 12/0811 |
| | | | 711/119 |
| 2014/0281243 A1* | 9/2014 | Shalf | G06F 12/0813 |
| | | | 711/122 |

OTHER PUBLICATIONS

M. M. Martin et al., "Why On-chip Cache Coherence is Here to Stay", Communications of the ACM, 55(7), pp. 78-89, 2012.

L. M. Silva et al. "Implementing Distributed Shared Memory on Top of Mpi: the Dsmpi Library", Technical report, 1995, 8 pages.

Kelm et al., "SChISM: Scalable Cache Incoherent Shared Memory", dated Aug. 2008, 25 pages.

Ismail et al., "A Locked Cache-Based Synchronization Protocol for CMP", dated in PDPTA 2006, 7 pages.

E. Darnell et al., "Automatic Software Cache Coherence Through Vectorization", In Proceedings of the 6th international conference on Supercomputing, pp. 129-138. ACM, 1992.

Adve et al., "Comparison of Hardware and Software Cache Coherence Schemes", to appear in the Proceedings of the 18th Annual International Symposium on Computer Architecture, dated 1991, 12 pages.

\* cited by examiner

MEMORY COHERENCE IN A MULTI-CORE, MULTI-LEVEL, HETEROGENEOUS COMPUTER ARCHITECTURE IMPLEMENTING HARDWARE-MANAGED AND SOFTWARE MANAGED CACHES

TECHNICAL FIELD

The present disclosure relates generally, to cache coherence. The disclosure relates more specifically to computer-implemented techniques for ensuring the consistency of shared resource data in multi-core, multi-level, heterogeneous computer architectures that employ both hardware-managed and software-managed caches.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multi-core systems with per-core caches and a single shared memory addressing space face the problem of inconsistent data. In such systems, multiple caches may store separate copies of the same memory block. When a core updates data within the memory block, then previously cached versions of the memory block become invalid. Without cache coherence, there is a possibility that invalid data will be provided from a cache to one of the cores.

Multi-core systems typically employ hardware-based devices that enforce cache coherence and prevent cores from operating on invalid data. Hardware-based approaches provide a relatively fast and effective solution to the cache coherence problem. However, as the number of cores and caches increase within a multi-core system, the level of complexity, power consumption, and amount of silicon real estate required by coherence-enforcing hardware also increase. These factors raise cost concerns and present implementation challenges when trying to scale the hardware-based approach to larger and larger systems.

To reduce costs associated with the hardware-based approach, hybrid solutions have been proposed. These solutions generally involve software-based enforcement of coherence with some hardware support. According to one such approach, software is responsible for triggering and otherwise managing coherence actions, while Bloom filters are implemented in hardware to invalidate incoherent data. Hybrid solutions generally cannot perform at the same speed as fully hardware-based solutions. However, the hybrid solutions may be easier to scale, attempting to trade as little performance for as much reduction of power and silicon area as possible.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
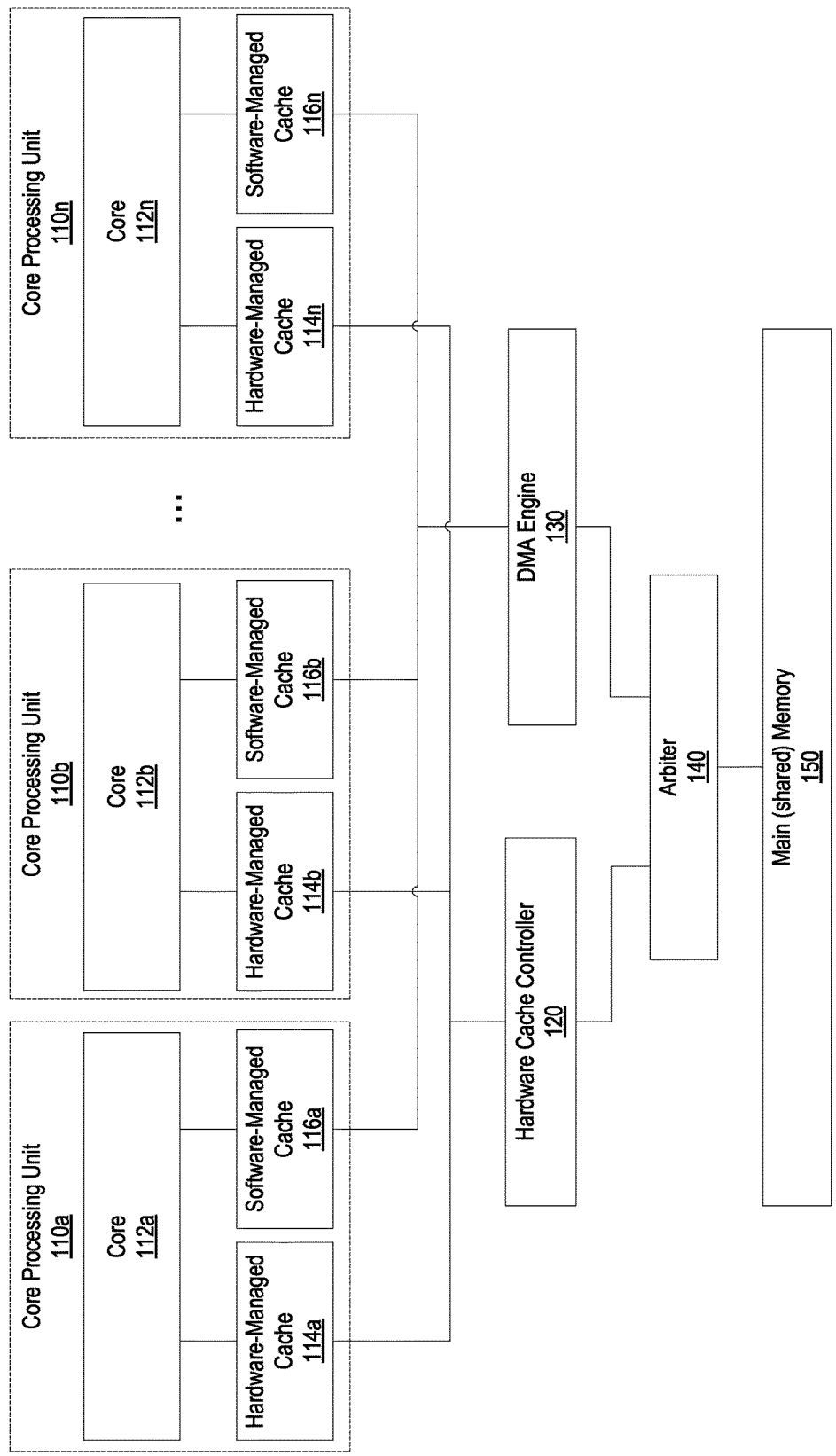
FIG. 1 illustrates an example multi-core system with a heterogeneous memory architecture.

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

Techniques are described herein for enforcing memory coherence in multi-core systems with heterogeneous memory architectures. In various embodiments, the memory architecture comprises both a set of hardware-managed caches and a set of software managed caches through which a particular core may access data. In order to enforce coherence, buffers allocated in memory are associated with respective metadata tags that identify the state of the buffers. Enforcement logic within the multi-core system may then read/modify the tags to identify the state of the buffer and to perform appropriate coherence management operations.

The techniques described herein for enforcing memory coherence within the heterogeneous memory architecture may be embedded into memory management application programming interfaces (APIs) relying on instructions in standard instruction set architectures (ISAs). The APIs allow cache coherence to be managed by software without any hardware coherence. Because no additional hardware circuitry is required to enforce coherence, the APIs are highly scalable and may be deployed in large multi-core systems with relatively low cost.

The techniques described herein may provide significant advantages for multi-core systems with the following characteristics:

The number of cores/caches sharing the same addressing space is relatively large (e.g., in the order of tens or hundreds);

The intended applications generally share a minimal amount of data such that a relatively small portion of the code base is involved in enforcing coherence explicitly; and The access pattern of the shared data-structures is single writer and single/multiple readers.

For multi-core systems with the above characteristics, the memory coherence schemes described below may afford substantial power and silicon real estate savings.

Multi-Core, Multi-Level, Heterogeneous Computer Architecture

In a multi-core system with a homogenous memory architecture, the path between the pipeline of a specific core and the main memory is unique, regardless of how many levels of caches are present in the system. With a level three (L3) cache, for example, all three levels of cache reside on the same path in relation to the pipeline of a particular core. A more sophisticated approach involves employing different paths between the core's pipeline and shared memory. According to one such approach, two distinct paths are associated with each core: a first path for hardware-managed caches and a second path for software-managed caches.

A "hardware-managed cache" as used herein refers to a cache in which hardware is responsible for the loading and storage mechanisms used to access data. For instance, the underlying hardware may either load a data item into the cache or evict a data item from the cache in a manner that is transparent to software that is accessing memory. An L1 data cache (d-cache) is an example of a hardware-managed cache; however, other types of hardware-managed caches may also be used, depending on the particular implementation. Although the term "hardware-managed" is used with respect to these caches, enforcement of coherence with respect to these caches may be performed by software as described in further detail below.

A "software-managed cache" as used herein refers to a cache in which the loading and storage mechanisms for accessing data are explicitly controlled by software. For instance, software instructions may be executed to program a direct memory access (DMA) controller to load a data item into the cache. Thus, the loading of data into a software-managed cache is not performed transparently with respect to the software but rather is explicitly controlled by it such that the software is responsible for moving data between different levels in the memory hierarchy. Examples of software-managed caches include, without limitation, scratchpad memories, local caches used in some processor architectures, and the caches used in some graphics processing units (GPUs); however, other types of software-managed caches may also be used, depending on the particular implementation.

FIG. 1 illustrates an example multi-core system with a heterogeneous memory architecture, according to an embodiment. System 100 generally comprises core processing node 110a to 110n, hardware cache controller 120, direct memory access (DMA) engine 130, arbiter 140, and main memory 150. Each of core processing nodes 110a to 110n comprises a core processing unit that is associated with two distinct local kinds of memory: a local hardware-managed cache and a local software-managed cache. Thus, core 112a is associated with hardware-managed cache 114a and software-managed cache 116a, core 112b with hardware-managed cache 114b and software managed cache 116b, core 112n with hardware-managed cache 114n and software-managed cache 116n, and so on. A "core" in this context may represent a physical core of a processor or a virtual core. As an example, cores 112a to 112n may be different cores of the same central processing unit (CPU) or may represent different processors.

Multiple paths exist between the pipeline of each of cores 112a to 112n and main memory 150. With respect to core 112a, for instance one path flows from main memory 150, through arbiter 140, hardware cache controller 120, hardware-managed cache 114a and into the pipeline of core 112a. Another path flows from main memory 150 through arbiter 140, DMA engine 130, software-managed cache 116a and into the pipeline of core 112a. Similarly, for each of the other cores, one path traverses the hardware-controlled caching mechanism, and the other path traverses the software-controlled caching mechanism for each of the cores. Arbiter 140 manages conflicts between the separate paths by preventing concurrent accesses of main memory 150 by hardware cache controller 120 and DMA engine 130.

The data in software-managed caches 116a to 116n may be accessed through a disjoint, separate addressing space than the data in hardware-managed caches 114a to 114n and main memory 150. For example, in order to access a buffer that is stored in hardware-managed cache 114a or main memory 150, core 112a may use a corresponding memory address from a first address space. To access a copy of the buffer from software-managed cache 116a, core 112a may use a different memory address from a second address space that is disjoint from the first address space.

With both hardware-managed and software-manage caches, system 100 is able to take advantage of caching optimizations for the different types of caches. For general-purpose systems, hardware-managed caching may reduce overhead costs associated with software-managed caches and may provide a greater degree of thread parallelism. Hardware-managed caching also does not require any effort on the part of the programmer and may be useful in legacy code bases that do not have embedded support for software-controlled caching. Software-managed caching, on the other hand, allows for greater flexibility as software has full control over the contents of the cache. For specific applications with predictable access patterns, software-managed caching may provide specifically tailored cache policies that control which data is replaced within the cache, thereby optimizing data access patterns and times.

Buffer and Metadata Tags

In one embodiment, memory is allocated in units referred to herein as buffers. A "buffer" in this context is a contiguous block of memory that forms a single unit managed by system 100. The buffers may be allocated in an on-demand fashion upon the request of a software application. As an example, a particular application may submit an allocation request to the memory system to store a particular amount of data. In response, the memory system may allocate a buffer from a heap, free store, or some other pool of memory blocks that are unused or otherwise available within main memory 150.

Figure 2:
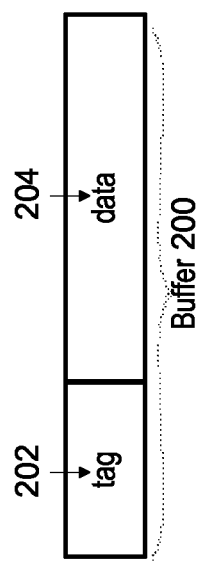
FIG. 2 illustrates an example managed buffer that includes a data part and a metadata tag.

Each buffer has an associated metadata tag and data part. Referring to FIG. 2, for example, it depicts buffer 200, which includes tag 202 and data field 204. Tag 202 stores metadata used for allocation and coherence operations. Data field 204 may store any type of data to fulfill memory requests for a target application. While logically a tag can reside anywhere, tag 202 is depicted as an additional amount of memory contiguous with buffer 200 and prepended to buffer 200. In other embodiments, tag 202 may be appended to buffer 200 or may be noncontiguous with data field 204. In embodiments where tag 202 is noncontiguous, pointers may be stored that associate tag 202 with buffer 200.

The size of the buffers may vary from implementation to implementation. In principle, a buffer may be any size allowed by the memory system. However, in some embodiments, the buffer size may be restricted to a multiple of the cache line size. The reason for such a restriction is that it may facilitate some coherency operations described below that involve flushes and/or invalidations of a buffer and/or its associated tag. Some memory systems only allow these operations at cache line granularity. If a system allows these operations at a different granularity, then the size of the buffers may change accordingly.

Figure 3:
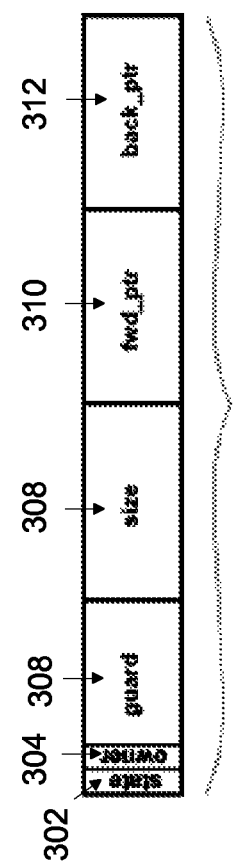
FIG. 3 illustrates an example internal structure of a metadata tag that includes a plurality of metadata fields for managing an associated buffer.

FIG. 3 illustrates an example internal structure for tag 202, which includes state field 302, owner field 304, guard field 306, size field 308, forward pointer 310, and backward pointer 312. Each of these values may be used during allocation and coherence operations such as described in further detail below. Although a specific structure is depicted for tag 202, the ordering, size, and type of field values included within tag 202 may vary from implementation to implementation. For example fields such as guard field 306, forward pointer 310, and/or backward pointer 312, may be omitted from a metadata tag and/or additional metadata information included depending on the particular allocation and coherence enforcement logic used within system 100.

The size of tag 202 may vary from implementation to implementation. In one embodiment, tag 202 is the size of a single cache line. One reason to restrict the size of the tag 202 to a single cache line is that it keeps the footprint of tag 202 relatively low within memory. A second reason is that it allows all values within the tag to be read in a single transfer. A third reason is that is allows more robust updates to all values—especially the state and guard values—at the same time. While restricting the size of a metadata tag may yield the above benefits, the tag may be a multiple of the cache line size or an arbitrary size in other implementations. A larger size allows for more metadata to be stored, which may be useful when there are a large number of owners or when larger guard values are desired.

Buffer Ownership

A buffer may be "owned" by an execution unit at a particular point in time. An "execution unit" in this context may refer to a core or a particular thread (or process) executing within the core. In order to track ownership, each execution unit that shares main memory 150 may have a unique identifier. The metadata tag may store the unique identifier for the execution unit that owns the buffer. As an example, each of cores 112a to 112n may be assigned separate and distinct identification numbers. If core 112a is the owner of buffer 200, then the identification number for core 112a may be stored in owner field 304.

Buffer States

A buffer may be associated with one of a plurality of states at a particular point in time. In one embodiment, a buffer may be either in the exclusive (E) state or in the shared (S) state. In the exclusive state, only the owner of the buffer (as specified in the buffer's tag) is permitted to write and read the buffer's content. In the shared state, any execution unit can read the buffer, but no execution unit is permitted to write it. As an example, if buffer 200 is in the exclusive state and owned by core 112a, then only core 112a may read and write to data field 204. Cores 112b to 112n are prevented from doing so. In the shared state, cores 112a to 112n may all read data field 204, but all are prevented from writing to data field 204.

Orthogonally from the exclusive/shared state, a buffer can be either in the hardware-cacheable (C) state or in the DMA-able (D) state (also referred to herein as the "software-cacheable" state). A hardware-cacheable buffer may only be written and read using APIs that access the buffer through hardware-managed caches 114a to 114n, and a DMA-able buffer may only be written and read using the APIs that manage software-managed caches 116a to 116n using DMA engine 130.

A free buffer is in the available (A) state. In this state, the buffer is free to be allocated to a requesting execution unit.

Figure 4:
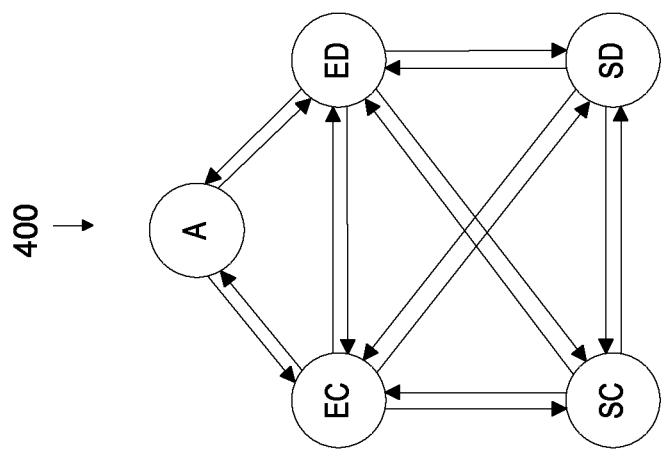
FIG. 4 illustrates an example state machine diagram with a plurality of nodes representing different states of a managed buffer.

FIG. 4 illustrates state machine diagram 400, which comprises a plurality of nodes representing different states of a managed buffer, according to an embodiment. While in the available state, the buffer may transition to the exclusive hardware-cacheable state (EC) or the exclusive software-cacheable state (ED). In implementations where the EC state is likely to represent the common case, all newly-allocated buffer may transition to this state. However, the initial state of the buffer may vary from implementation to implementation. From the EC and ED states, the buffer may transition to any of the other states, including the shared hardware-cacheable state (SC) and the shared software-cacheable state (SD). From the SC state, the buffer may transition to the EC, ED, or SD state.

The state of each buffer allocated within the memory system is stored in the metadata tag associated with the respective buffer. For instance, buffer 200 may store a two-bit state identifier that indicates whether buffer 200 is in the EC, ED, SC, or SD state. During coherence checks, this metadata may be read and used to determine which operations are allowed, as described further below.

Memory Coherence During State Changes

Over time, a buffer may transition between the different states indicated in state machine diagram 400. Table 1 below illustrates example operations that may be performed to enforce coherence when changing states. Each column represents the current state of the buffer, and each row the operation that may be performed to maintain memory coherence. The operations are performed by the buffer owner only. If the calling execution unit is not the owner, as determined by the check owner instruction, then an error is returned.

TABLE 1

State changes and associated coherence operations

| | Current State | | | |
|---|---|---|---|---|
| Operation | ED | EC | SD | SC |
| Reserve for software-managed cache | invalidate tag; read tag; check owner | invalidate tag; read tag; check owner; flush buffer; state ← ED; flush tag | invalidate tag; read tag; check owner; state ← ED; guard++; flush tag | invalidate tag; read tag; check owner; state ← ED; guard++; flush tag |
| Reserve for hardware-managed cache | invalidate tag; read tag; check owner; state ← EC; flush tag | invalidate tag; read tag; check owner | invalidate tag; read tag; check owner; state ← EC; guard++; flush tag | invalidate tag; read tag; check owner; state ← EC; guard++; flush tag |
| Publish for software-managed cache | invalidate tag; read tag; check owner; state ← SD; flush tag | invalidate tag; read tag; check owner; flush buffer; state ← SD; flush tag | invalidate tag; read tag; check owner | invalidate tag; read tag; check owner; state ← SD; flush tag |
| Publish for hardware-managed cache | invalidate tag; read tag; check owner; state ← SC; flush tag | invalidate tag; read tag; check owner; flush buffer; state ← SC; flush tag | invalidate tag; read tag; check owner; state ← SC; flush tag | invalidate tag; read tag; check owner |

The reserve operations involve placing the buffer into an exclusive state while the publish operations place the buffer into a shared state, either via the hardware-managed caches or the software-managed caches. Since the operations depicted in Table 1 involve changing the state field within a metadata tag, the first step in each operation is invalidating the buffer's tag in all execution units as their caches may contain a copy. After the tag is changed by the owner during the state transition, the owner flushes the tag from its cache to main memory 150, making the tag visible to other execution units.

The metadata operations, such as reading and changing the tags, are assumed to be performed using hardware-managed cache load and store operations rather than DMA operations that leverage software-managed caches 116a to 116n. This is the reason for the tag invalidation and flushing instructions for each operation. However, in other implementations, the DMA engine 130 may be leveraged for tag loads and stores.

With respect to the actual data portion of the buffer, there is a distinction between when the buffer is in a hardware-managed cache and when the buffer is in a software-managed cache. If the current state is EC, then changing to any other state may mean making the data available to all—including the owner itself—either through the hardware-managed caches or through the software-managed caches. The data is flushed to memory to ensure that the execution units have access to the most recent copy of the data. If the current state is SC, then data is being read by execution units from memory through a hardware-managed cache. If the current state is either ED or SD, then data accesses are not handled through the hardware-managed caches. Therefore, hardware-manage cache operations are not performed for the data part of the buffer but are performed for the tag part of the buffer since the operations of Table 1 assume that the tags are handled through the hardware-managed caches and not through the software-managed caches.

As previously indicated, only the owner may change the state of a buffer according to one embodiment. Other executions units may request that the owner change the state of the buffer, but are prevented from directly updating the state field of the tag to change the state of the buffer. As an example, if core 112a owns buffer 200, and buffer 200 is currently in the EC state, core 112b may request that core 112a transition buffer 200 to a shared state. In response to the request, core 112a may change the state of buffer 200 to SC or SD per the corresponding operation listed in Table 1. After the state transition, core 112b may read the buffer via hardware-managed cache 114b or software-managed cache 116b.

Memory Coherence During Ownership Changes

In order to maintain coherence, non-owners may be prevented from writing a buffer to main memory 150. A non-owner may request a change in ownership to gain control of the buffer and to perform writes of the buffer. For example, if core 112a is the owner of buffer 200, core 112b may submit a request to core 112a to obtain ownership of buffer 200. In response, core 112a may change the value stored in owner field 304 to the unique identifier for core 112b. Once the ownership change is complete, core 112b has control to change the state of the buffer and, when the buffer is in the ED or EC state, write to data field 204.

During ownership changes, coherence operations may be performed based on the current state of the buffer to which the change is being applied. For example, Table 2 shows example coherence operations that may be performed when changing the owner of a buffer. The operations depicted are similar to those described above with respect to Table 1, since changing the owner involves changing a value in the metadata tag. In this case, the value of owner field 304 is changed.

TABLE 2

Ownership change and associated coherence operations for each state

| | Current State | | | |
|---|---|---|---|---|
| Operation | ED | EC | SD | SC |
| Change owner | invalidate tag; read tag; check owner; set new owner; flush tag | invalidate tag; read tag; check owner; flush buffer; set new owner; flush tag | invalidate tag; read tag; check owner; set new owner; flush tag | invalidate tag; read tag; check owner; set new owner; flush tag |

The coherence operations depicted in Table 2 are the same for each state with the exception of the EC state. If the owner of a buffer is changing the ownership of a buffer that was in the EC state, a data flush is performed to avoid losing modified data that may still be in the hardware-managed cache.

Allowed Operations Based on Buffer State

State machine diagram 400 implicitly defines which operations are allowed in each state. A non-owner core is not permitted to write a buffer or to change the buffer's metadata (the tag). The owner is allowed to read a buffer in the exclusive state as cache management operations keep the owner's view of the buffer coherent. Also, both non-owners and owners may be permitted to read the buffer via the software managed cache using DMA operations in the SC states as coherence operations may be used to maintain memory coherence in these states even when reading data into the software-managed buffers. In alternative embodiments, cores may be prevented from reading the buffer via the software-managed caches while the buffer is in the SC state, since this state is a hardware-cacheable state.

TABLE 3

Operations allowed in each state

| | Read/write by owner only | | Read only by all | |
|---|---|---|---|---|
| Operation | ED | EC | SD | SC |
| Write via hardware-managed cache by owner | Not allowed | OK | Not allowed | Not allowed |
| Write via hardware-managed cache by non-owner | Not allowed | Not allowed | Not allowed | Not allowed |
| Read via hardware-managed cache by owner | Not allowed | OK | Not allowed | OK |
| Read via hardware-managed cache by non-owner | Not allowed | Not allowed | Not allowed | OK |
| Write via software-managed cache by owner | OK | Not allowed | Not allowed | Not allowed |

TABLE 3-continued

Operations allowed in each state

| | Read/write by owner only | | Read only by all | |
| --- | --- | --- | --- | --- |
| Operation | ED | EC | SD | SC |
| Write via software-managed cache by non-owner | Not allowed | Not allowed | Not allowed | Not allowed |
| Read via software-managed cache by owner | OK | Not allowed | OK | OK |
| Read via software-managed cache by non-owner | Not allowed | Not allowed | OK | OK |

Guard Value Checks During Coherence Operations

A change from a shared to an exclusive state generally indicates that the owner intends to change the contents of the buffer. Once the change to the buffer is complete, the owner may change the state back from the exclusive state to the shared state. During this time the old contents of the buffer may still reside in one or more hardware-managed and/or one or more software-managed caches. In order to prevent stale versions of a buffer from being provided to a core, the guard value is updated when the owner core changes the state of a buffer from shared to exclusive. Non-owners may then check the current guard value against the guard value of a cached buffer to determine whether the cached value is still coherent. If not, then the cached buffer may be invalidated.

In some embodiments, the guard value may be implemented as an unsigned counter that is incremented each time the guard value is updated (i.e., when the state of the buffers changes from a shared state to an exclusive state). The increment is an unsigned addition that rolls over to zero when adding one to the largest number that can be represented with however many bits are used for the guard. This method guarantees that an incorrect read may only happen if between the first tag read and a second tag read, exactly $2^n$ write operations occur, where n is the number of bits in the guard. As the number of bits used for the guard value increases, the likelihood of an incorrect read significantly decreases. The guard may or may not be initialized or reset when a buffer is free, since the actual value of the guard is irrelevant for purposes of maintaining coherence. However, the value of the guard is not reset when changing owners.

In other embodiments, coherency operations may be performed without the use of guard values. For example, rather than updating a guard value each time the owner changes the state from the exclusive state to the shared state, this change may be broadcast to each of the non-owner cores. In response to receiving the broadcast message, the non-owner cores may invalidate stale versions of the buffer, if any, within their local caches.

Free List Pointers

In one embodiment, tag 202 includes two memory pointers: forward pointer 310 and backward pointer 312. These pointers may be used to insert a freed buffer into a doubly-connected free list, with forward pointer 310 pointing to the next available buffer in the list and backward pointer 312 pointing to the previous available buffer in the list. However, in other embodiments, one or both of these pointers may be omitted from the tag since the free list may be implemented in any other way or other dynamic memory allocation techniques may be used to allocate buffers without affecting the coherence management operations described herein.

API Overview

The memory coherence operations described above may be embedded into APIs that handle interactions within memory. When these APIs are invoked, the metadata tag for a managed buffer may be read to determine the current state of the buffer. Based on the current state of the buffer and the API that was invoked, a corresponding coherence operation may be performed to enforce memory coherence for hardware-managed caches 114a to 114n and software-managed caches 116a to 116n.

APIs that handle interactions within memory may generally be categorized as follows:
 Allocation/free APIs: Includes a set of functions that manage free space and handle memory allocations.
 Load/Store APIs: Includes a set of functions that handle transfers to and from memory.
 State management APIs: Includes a set of functions that handle the state and the ownership of the buffers.

Each category of API is described in further detail below including example implementations for each category. As previously indicated, the example implementations are given by way of illustration; the names, functions, and other details of the APIs may vary depending on the particular implementation.

Allocation and Free APIS

Allocation and free APIs are responsible for allocating buffers within memory and managing available memory within system 100. Example allocation and free APIs may include, without limitation:
 void*xmalloc(size_t size): Returns a pointer to a buffer of size bytes if available, or a null value otherwise. The buffer is aligned to cache line boundaries. The buffer by default is returned in the EC state as it is assumed that this is the common case.
 void*xcalloc(size_t n_elem, size_t elem_size). Returns a buffer large enough for n_elem elements each of size elem_size bytes, completely initialized to zero. The buffer is returned in the EC state. The buffer is aligned to cache line boundaries, and the implementation may also decide whether to also align individual elements to cache line boundaries, potentially for a large memory overhead but allowing element-level granularity for coherence operations.
 void*xfree(void*buffer). Returns a buffer to the free list, setting its state to A.

The specific details of the APIs provided above may vary from implementation to implementation. For example, the APIs above assume the default state for a buffer is EC, but in other implementations, the default state may be ED or some other state. In addition, the above APIs assume the support of a free list to keep track of the available memory within system 100. However, the implementation of the free list may be omitted without affecting the coherence operations described herein. Also, as previously mentioned, in some implementations, buffers may be allocated that are not aligned to cache line boundaries.

Load and Store APIS

Load and store APIs are responsible from transferring buffers to and from memory. A first set of APIs may be used to handle transfers between memory 150 and hardware-managed caches 114a to 114n, and a second set of APIs may be used to handle transfers between memory 150 and software-managed caches 116a to 116n.

Figure 5A:
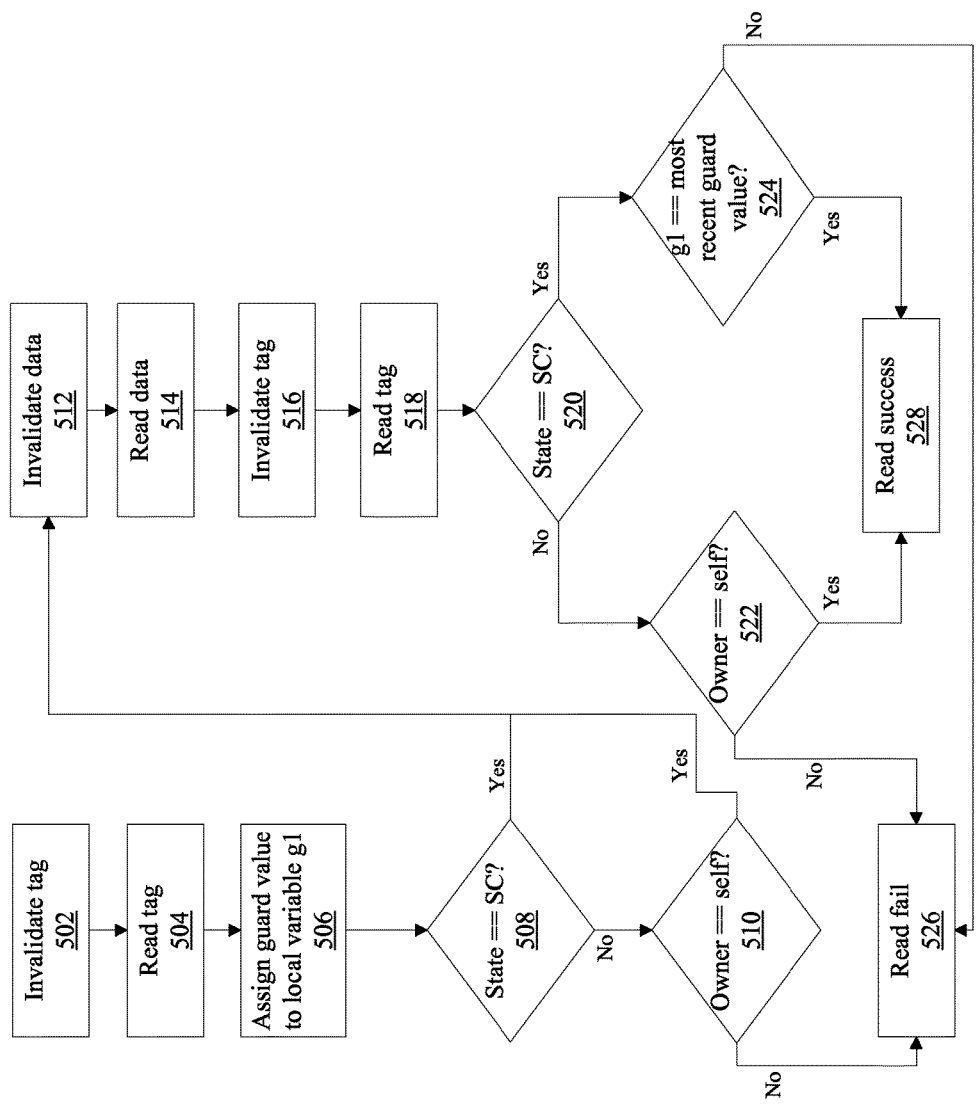
FIGS. 5A-5D illustrate example application programming interface operations for hardware-managed caches that include coherence checks.

FIG. 5A depicts an example load through hardware-managed cache operation. When a load request that targets a buffer is received from one of cores 102a to 102n, any previous version of the metadata tag associated with the target buffer is invalidated in step 502. The tag is then read at step 504 to extract the guard value, current state, and owner information. In step 506, the guard value is assigned to a local variable within the hardware-managed cache. In step 508, it is determined based on the read metadata whether the buffer is in the SC state. If so, then the process may continue to step 512. If not, then the process continues to step 510, where the owner of the buffer is checked. If the execution unit that requested the load is the owner of the buffer, then the buffer may be loaded into the hardware-managed cache as the owner controls the current state of the buffer. Thus, the process may continue to step 512 if requesting execution unit is the owner. Otherwise the read fails at step 526.

Steps 512 to 528 depict the second phase of the load operation. At step 512, the data part of the buffer is invalidated within the requesting core's local hardware-managed cache. In step 514, the data part is read from memory 150 into the local hardware-managed cache. In step 516, the tag is again invalidated from the local core's hardware-managed cache, and in step 518, the tag is re-read into the local hardware-managed cache. The tag is re-read in order to check whether the state has changed from SC during the load. This is determined by checking the state of the buffer at step 520. If the state is SC, then the guard value is checked against the locally stored guard value at step 524 to determine whether there was there was a change during the load because the guard value is incremented every time the state of a buffer is changed from shared to exclusive, thus indicating a potential intervening write operation. If the current guard value does not match the locally stored guard value, then there was a change and the read fails at step 526. Otherwise, the read succeeds at step 528. If the state is not SC at step 520, then the process checks whether the requesting execution unit is the owner at step 522. If not, then the read fails at step 526. Otherwise, the read succeeds at step 528. An owner that is making the request may change the state of the buffer to a state that allows reads via the hardware-cache per the above tables above if the buffer is not currently in such a state. In other implementations that broadcast state changes to non-owner cores, the first phase of the load operation and the guard checks described above may be omitted without compromising cache coherence.

Figure 5B:
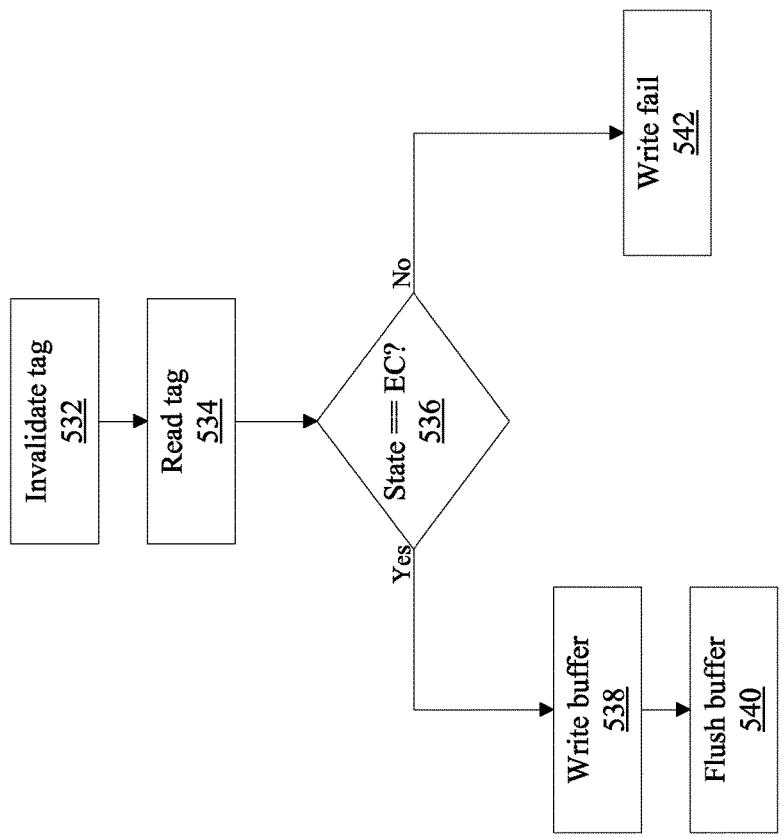

FIG. 5B depicts an example store through hardware-managed cache operation. At step 532, the tag is invalidated from the requesting core's local cache. At step 534, the tag is read from memory 150 into the requesting cores local hardware-managed cache. At step 536, the process determines from the state field of the read metadata tag whether the state of the target buffer is EC. If not, then the write fails at step 542. Otherwise, the buffer is written at step 538 to update the buffer's contents within the local hardware-managed cache. At step 540, the updated buffer is flushed from the hardware-managed cache to main memory 150.

Figure 6A:
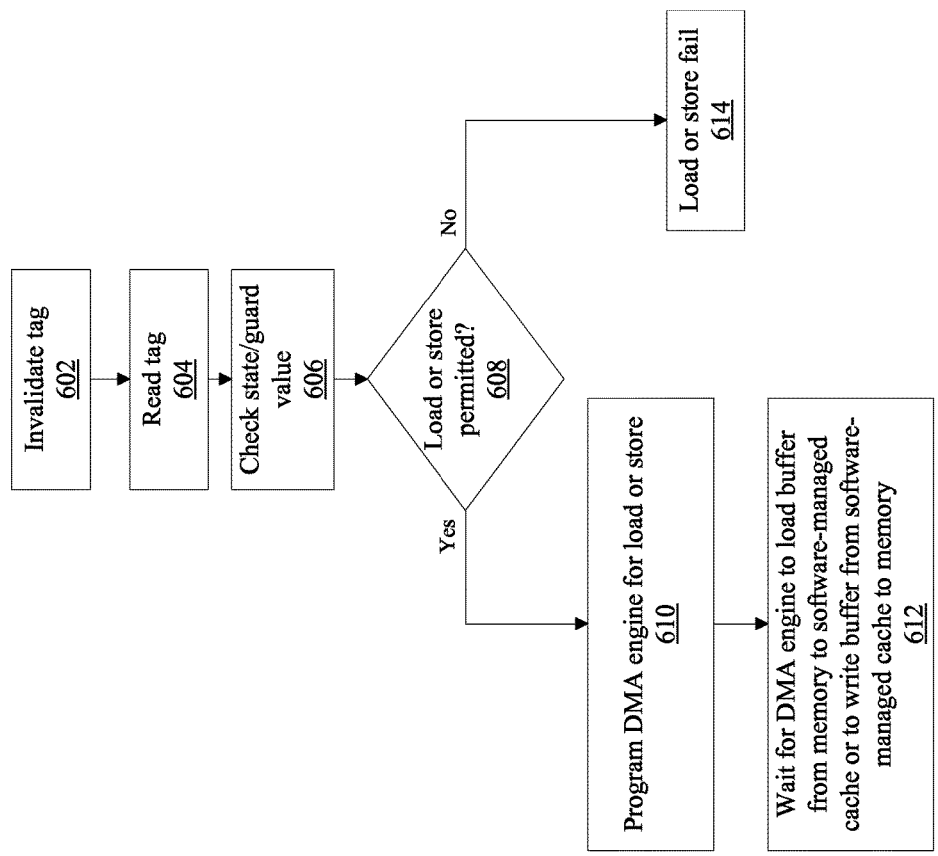
FIGS. 6A-6C illustrate example application programming interface operations for software-managed caches that include coherence checks.

FIG. 6A depicts example load and store through software-managed cache operations. At step 602, the tag is invalidated from the requesting cores hardware-managed cache. At step 604, the tag is read from main memory 150 into the requesting core's local cache. At step 606, the process checks the state of the buffer and guard value to determine whether a load or store through the software-managed cache is permitted. Whether or not the operation is permitted depends on whether the core is requesting a load or store through software-managed cache operation and the state of the buffer as detailed in Table 3 above. The guard value is also checked at this step for a load operation to determine whether there is a potential intervening write operation. If the process determines that the load or store is permitted at step 608, then the process continues to step 610, and DMA engine 130 is programmed to load the target buffer from main memory 150 to the requesting core's local software-managed cache (load operation) or to transfer the buffer from the local software-managed cache to main memory 150 (store operation). At step 612, the process waits for DMA engine 130 to complete the load or store operation. As data movements are handled by DMA engine 130, the loads and stores may be performed asynchronously by DMA engine 130 without involving a CPU. If, at step 608, it is determined that the load or store operation is not permitted (e.g., the state is EC or another state where the operation is not allowed per Table 3 above), then the load or store fails at step 614.

State Management APIS

When first allocated, a buffer may be initialized to the EC state or the ED state, meaning that the buffer is writable by its owner—the core that requested the allocation. Initializing the buffer in an exclusive state may be beneficial because a core normally would write data into a buffer before exposing it to other cores for reading.

The operation of changing the state from exclusive to shared—that is, to expose a buffer to other cores for reading—is referred herein as a publish operation. To optimize performance within the heterogeneous memory architecture, a distinction is made between two types of publications, depending on the way the buffer is supposed to be read, whether through the hardware-managed cache or through the software-managed cache. The reason why this is an optimization is because when a buffer is accessed using the software-managed cache, some data invalidation and flush operations may be omitted without the risk of data incoherence or corruption.

Figure 5C:
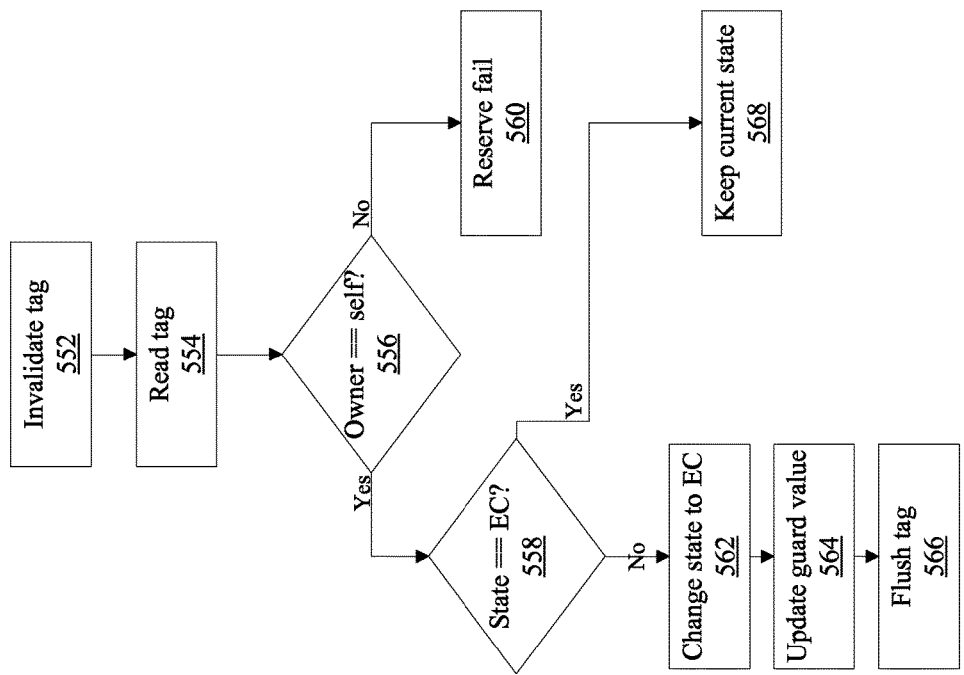

A reserve for hardware-managed cache operation changes the state of a buffer from any state to EC. Non-owners may be prevented from performing this operation. FIG. 5C depicts an example reserve for hardware-managed cache operation. In step 552, the tag of the target buffer is invalidated. In step 554, the tag of the target buffer is read, causing the tag to be transferred from main memory 150 to the local hardware-managed cache for the core performing the operation. In step 556, it is determined whether the core performing the operation is the owner. If not, then the reserve operation fails at step 560. If so, then the process checks to determine whether the state of the target buffer is already set to EC at step 558. If so, then the current state of the buffer is maintained at step 568. If not, the core changes the state of the buffer to EC at step 562 by updating the state field of the tag in the local hardware-managed cache. At step 564, the guard value is incremented or otherwise update within the guard field of the tag. At step 566, the tag is flushed, causing the tag to be transferred from the local hardware-managed cache to main memory 150, exposing the state change to other cores within system 100.

Figure 6B:
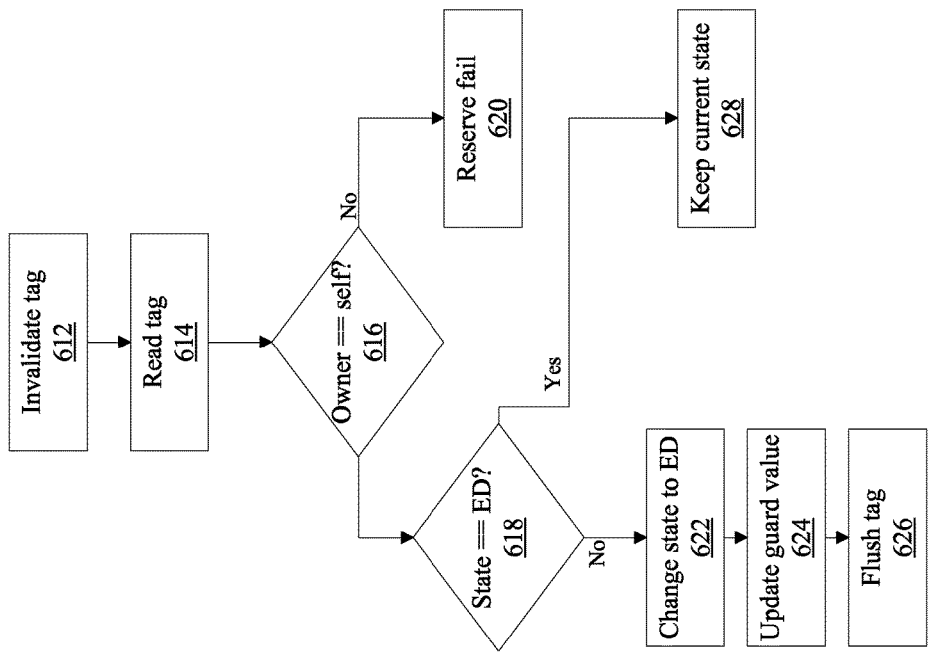

A reserve for software-managed cache operations changes the state of a buffer from any state to ED. Non-owners may be prevented from performing this operation. FIG. 6B depicts an example reserve for software-managed cache operation. Steps 612, 614, 616, and 620 mirror steps 552, 554, 556, and 560 of the reserve-for hardware-managed cache operation. At step 618, the process determines whether the state of the buffer is currently set to ED. If so, then the state is maintained at step 628. If not, then the state is changed to ED at step 622 within the local hardware-managed cache. The guard value is updated at step 624, and the tag is flushed at step 626, causing the tag to be transferred from the hardware-managed cache to main memory 150. Even though the state of the buffer is being changed to a software-managed cacheable state, the reading and modifying of the tag may be performed through the hardware-managed cache as indicated above.

Figure 5D:
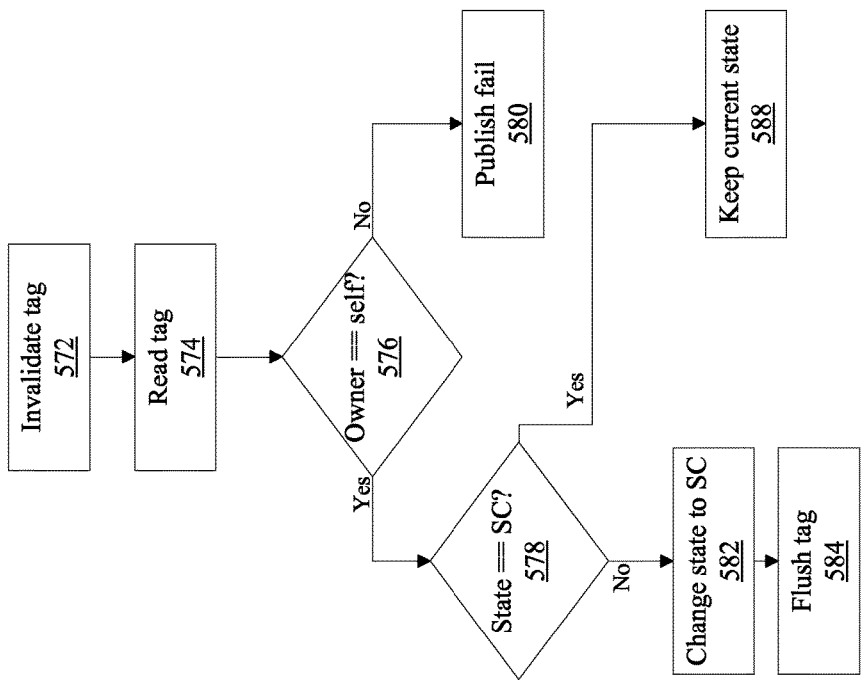

A publish for hardware-managed cache changes the state of a buffer from any state to SC. Non-owners may be prevented from performing this operation. FIG. 5D depicts an example publish for hardware-managed cache operation. At step 572, the tag is invalidated in the core's local hardware managed cache. At step 574, the tag is read, causing the most recent tag for the target buffer to be transferred from main memory 150 to the core's local hardware-managed cache. At step 576, the core determines whether it is the owner of the target buffer. If not, the publish operation fails at step 580. If so, then the process continues to step 578, and the process determines whether the target core is already in the SC state. If so, then at step 588, the current state is maintained. If not, then at step 582, the process changes the state of the buffer to SC by updating the state field of the buffer in the hardware-managed cache. At step 584, the tag is flushed, transferring the tag from the hardware-managed cache to main memory 150.

Figure 6C:
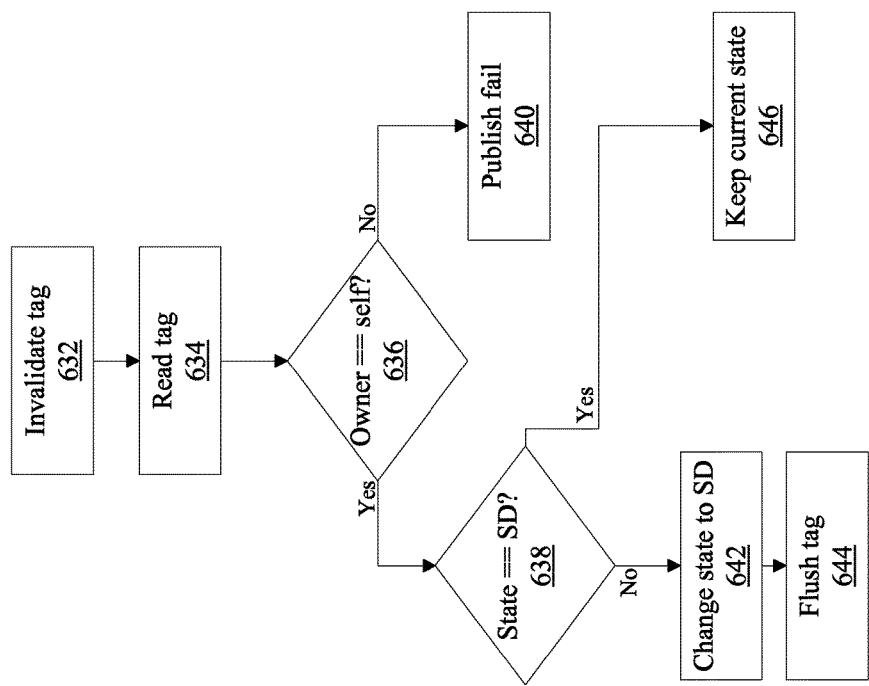

A publish for software-managed cache changes the state of a buffer from any state to SD. Non-owners may be prevented from performing this operation. FIG. 6C depicts an example publish for software-managed cache operation. At step 632, the tag is invalidated in the core's local hardware managed cache. At step 634, the tag is read, causing the most recent tag for the target buffer to be transferred from main memory 150 to the core's local hardware-managed cache. At step 636, the core determines whether it is the owner of the target buffer. If not, the publish operation fails at step 640. If so, then the process continues to step 638, and the process determines whether the target core is already in the SD state. If so, then at step 646, the current state is maintained. If not, then at step 642, the process changes the state of the buffer to SD by updating the state field of the buffer in the hardware-managed cache. At step 644, the tag is flushed, transferring the tag from the hardware-managed cache to main memory 150. Even though the buffer is being published for software-managed caches, the reading and modifying of the tag may be performed through the hardware-managed cache as indicated above.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
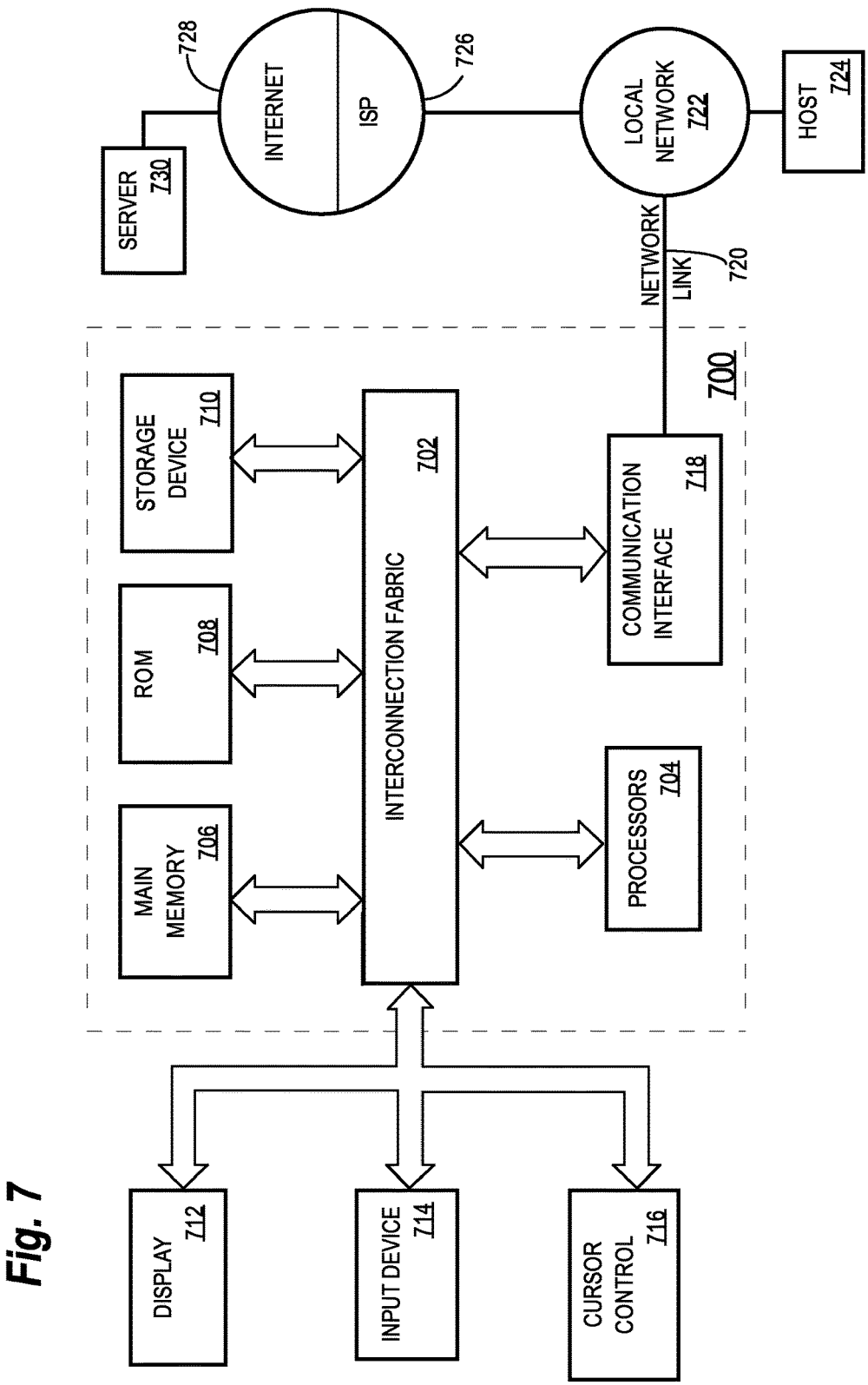
FIG. 7 illustrates a computer system upon which an embodiment may be implemented.

For example, FIG. 7 is a block diagram that illustrates a computer system 700 upon which an embodiment of the invention may be implemented. Computer system 700 includes interconnection fabric 702 or other communication mechanism for communicating information, and hardware processors 704 coupled with interconnection fabric 702 for processing information. Hardware processors 704 may be, for example, multi-core execution units such as depicted in FIG. 1.

Computer system 700 also includes a main memory 706, such as a random access memory (RAM) or other dynamic storage device, coupled to interconnection fabric 702 for storing information and instructions to be executed by processors 704. Main memory 706 also may be used for storing temporary variables or other intermediate information during execution of instructions to be executed by processors 704. Such instructions, when stored in non-transitory storage media accessible to processors 704, render computer system 700 into a special-purpose machine that is customized to perform the operations specified in the instructions.

Computer system 700 further includes a read only memory (ROM) 708 or other static storage device coupled to interconnection fabric 702 for storing static information and instructions for processors 704. A storage device 710, such as a magnetic disk, optical disk, or solid-state drive is provided and coupled to interconnection fabric 702 for storing information and instructions.

Computer system 700 may be coupled via interconnection fabric 702 to a display 712, such as a liquid-crystal display (LCD) or a light-emitting diode (LED) display, for displaying information to a computer user. An input device 714, including alphanumeric and other keys, is coupled to interconnection fabric 702 for communicating information and command selections to processors 704. Another type of user input device is cursor control 716, such as a mouse, a trackball, or cursor direction keys for communicating direction information and command selections to processors 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processors 704 executing one or more sequences of one or more instructions contained in main memory 706. Such instructions may be read into main memory 706 from another storage medium, such as storage device 710. Execution of the sequences of instructions contained in main memory 706 causes processors 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include am microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Storage media is distinct from but may be used in conjunction with transmission media. Transmission media participates in transferring information between storage media. For example, transmission media includes coaxial cables, copper wire and fiber optics, including the wires that comprise interconnection fabric 702. Transmission media can also take the form of acoustic or light waves, such as those generated during radio-wave and infra-red data communications.

Various forms of media may be involved in carrying one or more sequences of one or more instructions to processors 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on interconnection fabric 702. Interconnection fabric 702 carries the data to main memory 706, from which processors 704 retrieves and executes the instructions. The instructions received by main memory 706 may optionally be stored on storage device 710 either before or after execution by processors 704.

Computer system 700 also includes a communication interface 718 coupled to interconnection fabric 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processors 704 as it is received, and/or stored in storage device 710, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
associating each buffer in a plurality of buffers allocated in a main memory with a respective metadata tag that is stored in said main memory;
wherein each buffer in said plurality of buffers spans multiple cache lines within said main memory, wherein the respective metadata tag of said each buffer stores metadata identifying a respective state associated with said each buffer;
wherein said main memory is shared between multiple cores of a processor;
wherein an address space includes a first address space and a second address space that is disjoint with said first address space;
wherein for each core of said multiple cores:
said main memory is accessible via a respective hardware-managed cache of said each core, wherein said each core accesses data in the respective hardware-manage cache via said first address space, said respective hardware-managed cache belonging to a plurality of hardware-managed caches; and wherein said each core accesses data in a respective software-managed cache of said each core via said second address space and loads data between said main memory and said respective software-managed cache via a direct memory access engine, said respective software-managed cache belonging to a plurality of software-managed caches; and enforcing coherence between said plurality of hardware-managed caches and said plurality of software-managed caches based on the metadata stored in the respective metadata tag for each respective buffer in the plurality of buffers allocated in said main memory;

wherein for each buffer of said plurality of buffers, the respective metadata tag of said each buffer further stores a respective integer value that is incremented when the state of said each buffer is changed from a shared state to an exclusive state;

a particular core of said multiple cores performing a load operation of a particular buffer of said plurality of buffers, wherein while performing said load operation the respective metadata tag of said particular buffer specifies that the particular buffer is in a shared state and that the particular core is not the owner of said particular buffer, wherein performing said load operation includes determining whether the respective integer value of said particular buffer has changed to detect whether the particular buffer has been written to during said load operation.

2. The method of claim 1, wherein a particular buffer in the plurality of buffers is in a hardware-managed cacheable state; wherein while in the hardware-managed cacheable state, at least one core of said multiple cores is permitted to access the particular buffer via the respective hardware-managed cache of said at least one core and is prevented from accessing the particular buffer via the respective software-managed cache of said at least one core.

3. The method of claim 1, wherein a particular buffer in the plurality of buffers is in a software-managed cacheable state; wherein while in the software-managed cacheable state, at least one core of said multiple cores is permitted to access the particular buffer via the respective software-managed cache of said at least one core and is prevented from accessing the particular buffer via the respective hardware-managed cache of said at least one core.

4. The method of claim 1, wherein for a particular buffer in the plurality of buffers, the respective metadata tag of the particular buffer further stores metadata identifying an owner of the particular buffer; wherein an execution unit corresponding to the owner is permitted to change the respective state associated with said particular buffer within the respective metadata tag; wherein execution units that are not owners of the particular buffer are restricted from changing the state of the particular buffer within the respective metadata tag.

5. The method of claim 4, further comprising changing, by the owner of the particular buffer, the state of the particular buffer from a hardware-managed cacheable state to a software-managed cacheable state or from a software-managed cacheable state to a hardware-managed cacheable state.

6. The method of claim 4, further comprising, changing, by the owner of the particular buffer, ownership of the respective buffer in response to a request from an execution unit that is not the owner of the particular buffer.

7. The method of claim 1, wherein for each buffer of said plurality of buffers, the respective state of said each buffer is one of an available state, an exclusive hardware-cacheable state, a shared hardware-cacheable state, an exclusive software-cacheable state, or a shared software-cacheable state.

8. The method of claim 1, wherein the respective integer value of said particular buffer is used to enforce coherence between said plurality of hardware-managed caches and said plurality of software-managed caches.

9. The method of claim 1, wherein at least one buffer in the plurality of buffers is in an available state; wherein while in the available state any one of said multiple cores may reserve the at least one buffer; wherein reserving the at least one buffer causes the at least one buffer to transition to an exclusive state.

10. The method of claim 1, wherein for each buffer in said plurality of buffers, the respective metadata tag of said each buffer is stored entirely within a cache line spanned by said each buffer.

11. One or more non-transitory computer-readable media storing sequences of instructions which, when executed by a processor, cause:

associating each buffer in a plurality of buffers allocated in a main memory with a respective metadata tag that is stored in said main memory;

wherein each buffer in said plurality of buffers spans multiple cache lines within said main memory, wherein the respective metadata tag of said each buffer stores metadata identifying a respective state associated with said each buffer;

wherein said main memory is shared between multiple cores of the processor;

wherein an address space includes a first address space and a second address space that is disjoint with said first address space;

wherein for each core of said multiple cores:

said main memory is accessible via a respective hardware-managed cache of said each core, wherein said each core accesses data in the respective hardware-manage cache via said first address space, said respective hardware-managed cache belonging to a plurality of hardware-managed caches; and wherein said each core accesses data in a respective software-managed cache of said each core via said second address space and loads data between said main memory and said respective software-managed cache via a direct memory access engine, said respective software-managed cache belonging to a plurality of software-managed caches; and enforcing coherence between said plurality of hardware-managed caches and said plurality of software-managed caches based on the metadata stored in the respective metadata tag for each respective buffer in the plurality of buffers allocated in said main memory;

wherein for each buffer of said plurality of buffers, the respective metadata tag of said each buffer further stores a respective integer value that is incremented when the state of said each buffer is changed from a shared state to an exclusive state;

a particular core of said multiple cores performing a load operation of a particular buffer of said plurality of buffers, wherein while performing said load operation the respective metadata tag of said particular buffer specifies that the particular buffer is in a shared state and that the particular core is not the owner of said particular buffer, wherein performing said load operation includes determining whether the respective integer value of said particular buffer has changed to detect whether the particular buffer has been written to during said load operation.

12. The one or more non-transitory computer-readable media of claim 11, wherein a particular buffer in the plurality of buffers is in a hardware-managed cacheable state; wherein while in the hardware-managed cacheable state, at least one core of said multiple cores is permitted to access the particular buffer via the respective hardware-managed cache of said at least one core and is prevented from accessing the particular buffer via the respective software-managed cache of said at least one core.

13. The one or more non-transitory computer-readable media of claim 11, wherein a particular buffer in the plurality of buffers is in a software-managed cacheable state; wherein while in the software-managed cacheable state, at least one core of said multiple cores is permitted to access the particular buffer via the respective software-managed cache of said at least one core and is prevented from accessing the particular buffer via the respective hardware-managed cache of said at least one core.

14. The one or more non-transitory computer-readable media of claim 11, wherein for a particular buffer in the plurality of buffers, the respective metadata tag of the particular buffer further stores metadata identifying an owner of the particular buffer; wherein an execution unit corresponding to the owner is permitted to change the respective state associated with said particular buffer within the respective metadata tag; wherein execution units that are not owners of the particular buffer are restricted from changing the state of the particular buffer within the respective metadata tag.

15. The one or more non-transitory computer-readable media of claim 14, the sequences of instructions further comprising instructions that, when executed by said processor, cause changing, by the owner of the particular buffer, the state of the particular buffer from a hardware-managed cacheable state to a software-managed cacheable state or from a software-managed cacheable state to a hardware-managed cacheable state.

16. The one or more non-transitory computer-readable media of claim 14, the sequences of instructions further comprising instructions that, when executed by said processor, changing, by the owner of the particular buffer, ownership of the respective buffer in response to a request from an execution unit that is not the owner of the particular buffer.

17. The one or more non-transitory computer-readable media of claim 11, wherein for each buffer of said plurality of buffers, the respective state of said each buffer is one of an available state, an exclusive hardware-cacheable state, a shared hardware-cacheable state, an exclusive software-cacheable state, or a shared software-cacheable state.

18. The one or more non-transitory computer-readable media of claim 11, wherein the respective integer value of said particular buffer is used to enforce coherence between said plurality of hardware-managed caches and said plurality of software-managed caches.

19. The one or more non-transitory computer-readable media of claim 11, wherein at least one buffer in the plurality of buffers is in an available state; wherein while in the available state any one of said multiple cores may reserve the at least one buffer; wherein reserving the at least one buffer causes the at least one buffer to transition to an exclusive state.

20. The one or more non-transitory computer-readable media of claim 11, wherein for each buffer in said plurality of buffers, the respective metadata tag of said each buffer is stored entirely within a cache line spanned by said each buffer.

* * * * *